US011821982B2

(12) United States Patent
Scaramozzino et al.

(10) Patent No.: US 11,821,982 B2
(45) Date of Patent: Nov. 21, 2023

(54) DEVICES, SYSTEMS, AND METHODS FOR DETECTING MULTIPLE DEVICES WITHIN A PREDETERMINED PROXIMITY

(71) Applicant: ZEBRA TECHNOLOGIES CORPORATION, Lincolnshire, IL (US)

(72) Inventors: Umberto R. Scaramozzino, Port Jefferson, NY (US); Russell Calvarese, Stony Brook, NY (US); Menuka Gayan Senevirathna, Matara (LK); Charles Burton Swope, Coral Springs, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 387 days.

(21) Appl. No.: 17/104,100

(22) Filed: Nov. 25, 2020

(65) Prior Publication Data

US 2022/0163663 A1 May 26, 2022

(51) Int. Cl.
*G01S 15/10* (2006.01)
*H04W 4/80* (2018.01)
*G01S 7/52* (2006.01)

(52) U.S. Cl.
CPC ........ *G01S 15/102* (2013.01); *G01S 7/52004* (2013.01); *H04W 4/80* (2018.02)

(58) Field of Classification Search
CPC .... G01S 15/102; G01S 7/52004; G01S 15/74; H04W 4/80; H04W 4/023; H04W 4/20
See application file for complete search history.

(56) References Cited

U.S. PATENT DOCUMENTS

| | | | |
|---|---|---|---|
| 6,674,687 B2 * | 1/2004 | Zeitzew | G05D 1/0274 367/6 |
| 7,535,798 B2 * | 5/2009 | Kong | G01S 5/30 367/128 |
| 2003/0142587 A1 * | 7/2003 | Zeitzew | G01S 7/52004 367/127 |
| 2021/0359767 A1 * | 11/2021 | Link, II | H04W 4/029 |
| 2022/0163663 A1 * | 5/2022 | Scaramozzino | G01S 15/102 |

FOREIGN PATENT DOCUMENTS

WO WO-2022002994 A2 * 1/2022

* cited by examiner

*Primary Examiner* — Daniel Pihulic

(57) ABSTRACT

In an embodiment, the present invention is a method for ranging which includes emitting an acoustic signal at a first frequency, monitoring for a first acoustic response signal at a second frequency, and responsive to receiving the first acoustic response signal within a predetermined amount of time, (1) calculating a first distance between a first device and a second device based on a duration between emitting the first acoustic signal and receiving the first acoustic response signal, and (2) broadcast a first message including the distance and an identifier.

16 Claims, 4 Drawing Sheets

DEVICES, SYSTEMS, AND METHODS FOR DETECTING MULTIPLE DEVICES WITHIN A PREDETERMINED PROXIMITY

BACKGROUND

In late 2019 and early 2020, the COVID-19 outbreak emerged as a global pandemic creating significant obstacles in terms of social interaction. While the spread of the disease continues to be studied, it has become widely accepted that social distancing (i.e., maintaining a certain distance between any two individuals) helps reduce the spread of the virus. In view of this, there exist a need for greater awareness of the proximity between individuals and the accompanying devices, systems, and methods which assist in this task.

SUMMARY

In an embodiment, the present invention is a device for use in ranging relative to a remote device. The device includes: an acoustic emitter; an acoustic receiver; a short-range wireless radio frequency transceiver; and a controller communicatively coupled to each of the acoustic emitter, the acoustic receiver, and the short-range wireless radio frequency transceiver. The controller is configured to: cause the acoustic emitter to emit a first acoustic signal at a first frequency; monitor, via the acoustic receiver and for a first predetermined amount of time following an emission of the first acoustic signal by the acoustic emitter, for a first acoustic response signal generated by the remote device at a second frequency that is different from the first frequency; and responsive to receiving the first acoustic response signal within the first predetermined amount of time, (1) calculate a first distance between the device and the remote device based on a duration between emitting the first acoustic signal and receiving the first acoustic response signal, and (2) broadcast, via the short-range wireless radio frequency transceiver, a first message including the distance and a first identifier associated with at least one of the device or the short-range wireless radio frequency transceiver.

In another embodiment, the present invention is a method for ranging between a first device and a second device, each of the first device and the second device respectively having an acoustic emitter, an acoustic receiver, a short-range wireless radio frequency transceiver, and a controller communicatively coupled to each of the acoustic emitter, the acoustic receiver, and the short-range wireless radio frequency transceiver. The method includes: emitting, via the acoustic emitter of the first device, a first acoustic signal at a first frequency; monitoring, via the acoustic receiver of the first device and for a first predetermined amount of time following an emission of the first acoustic signal by the acoustic emitter of the first device, for a first acoustic response signal generated by the second device at a second frequency that is different from the first frequency; and responsive to receiving the first acoustic response signal within the first predetermined amount of time, (1) calculating, via the controller of the first device, a first distance between the first device and the second device based on a duration between emitting the first acoustic signal and receiving the first acoustic response signal, and (2) broadcast, via the short-range wireless radio frequency transceiver of the first device, a first message including the distance and a first identifier associated with at least one of the first device or the short-range wireless radio frequency transceiver of the first device.

In still another embodiment, the present invention is a device for use in ranging. The device includes: an acoustic emitter; an acoustic receiver; a short-range wireless radio frequency transceiver; and a controller communicatively coupled to each of the acoustic emitter, the acoustic receiver, and the short-range wireless radio frequency transceiver. The controller is configured to: compose a list of remote devices within a predetermined Received Signal Strength Indicator (RSSI) range by causing the short-range wireless radio frequency transceiver to emit a first wireless signal and respectively registering a first response wireless signal received from each of the remote devices within the predetermined RSSI range; and for each of the remote devices: transmit, via the short-range wireless radio frequency transceiver, a second wireless signal requesting a response; monitor, via the acoustic receiver and for a first predetermined amount of time following a transmission of the second wireless signal, for a first acoustic response signal generated by one of the remote devices; and responsive to receiving the first acoustic response signal within the first predetermined amount of time, (1) calculate a first distance between the device and the one of the remote devices based on a duration between transmitting the second wireless signal and receiving the first acoustic response signal, and (2) broadcast, via the short-range wireless radio frequency transceiver, a third wireless signal including an acknowledgement of receiving the first acoustic response signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
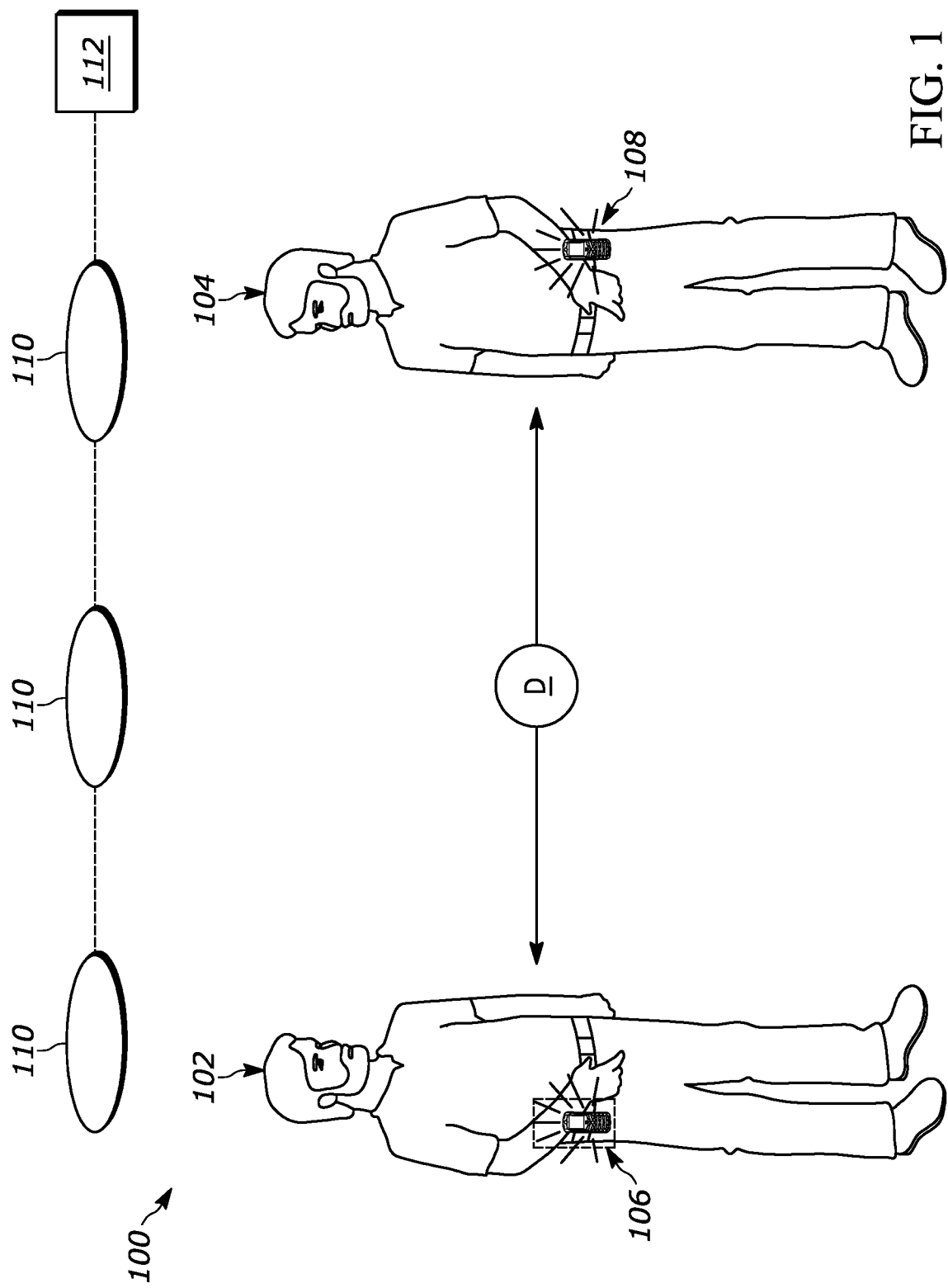
FIG. 1 illustrates an exemplary environment where devices in accordance with the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments consistent with the present disclosure are provided to help detect when individuals are within a certain proximity to others and take appropriate measures in response. Referring to FIG. 1, shown therein is an exemplary environment 100 where two individuals 102, 104 are standing within a certain distance (D) from each other. Individual 102 has a mobile device 106 and individual 104 has a mobile device 108. Each of these mobile devices can take a wide variety of designs and can be embodied in, for example, a mobile phone or a dedicated pager-like device wearable around the waist, leg, arm, neck, etc. In some implementations, mobile devices 106, 108 are operable to connect with wireless access points 110 which are in turn connected to a server 112. The combination of wireless access points 110 and server 112 may form a local area network where for example, both the wireless access points 110 and the sever 112 are situated within a small geographical area such as an office, a building or a group of buildings. Alternatively, the wireless access points 110 and server 112 may be formed by a wide area network where, for example, the wireless access points 110 and the server 112 are separated by a large geographic region. Additionally, it should be appreciated that while server 112 is illustrated as a single server, this is merely illustrative and server 112 may be comprised of one or a plurality of computers which may be separated whether physically or virtually.

Figure 2A:
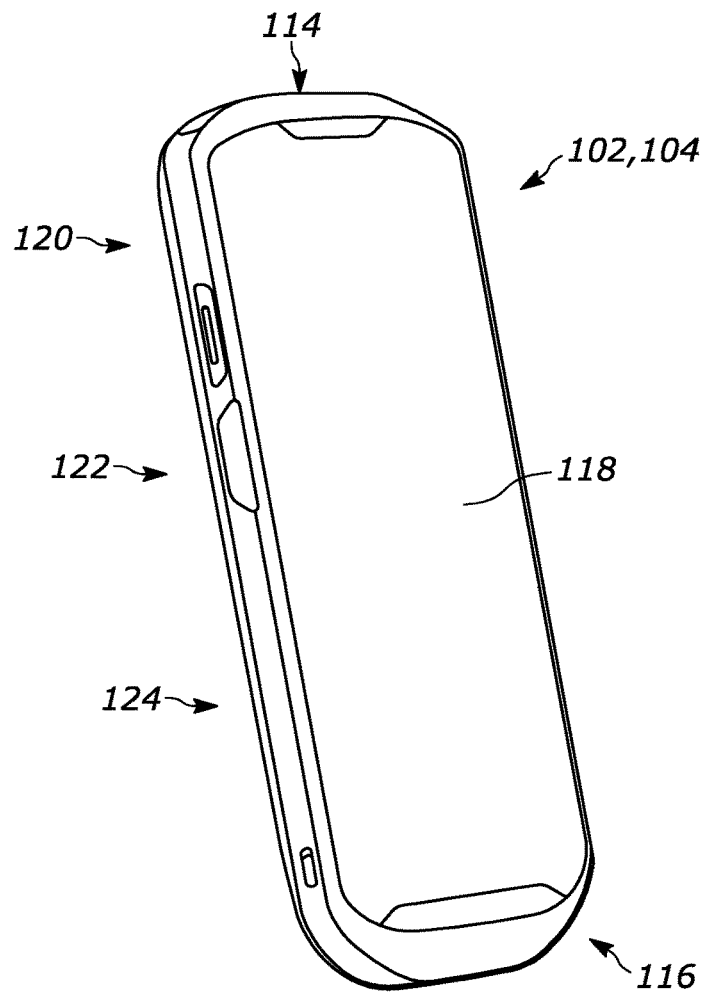
FIGS. 2A and 2B illustrate exemplary ranging devices in accordance with embodiments of the present invention.
Figure 2B:
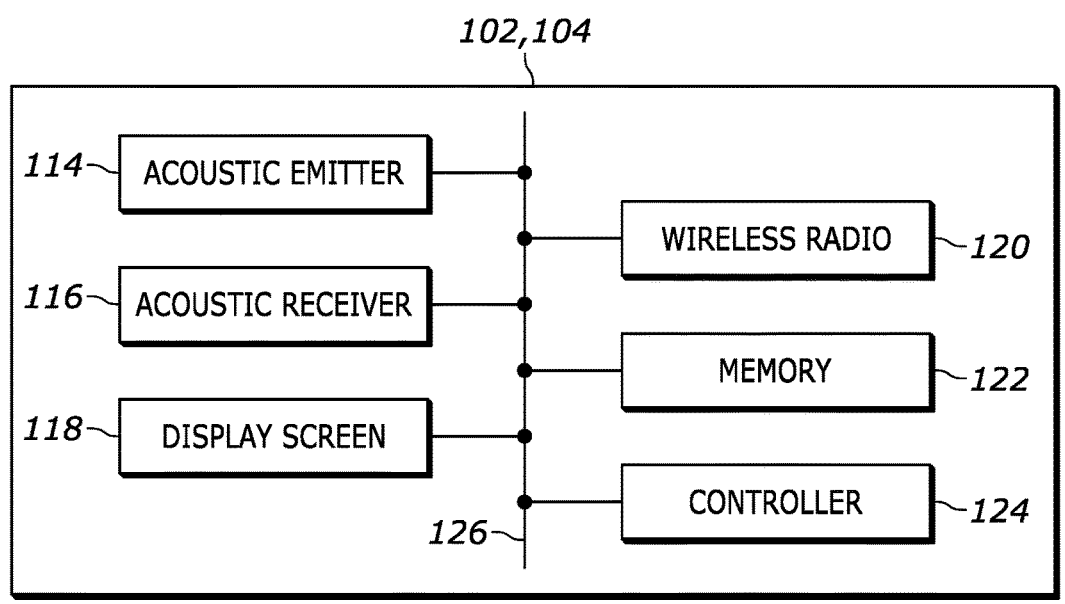

Moving to FIGS. 2A and 2B, shown therein is an exemplary mobile device 106, 108 which is embodied in an enterprise mobile device like, for example, TC56 Touch Computer from Zebra Technologies Corporation. Amongst other things, the mobile device includes an acoustic emitter 114, an acoustic receiver 116, a display screen 118, a short-range wireless radio frequency transceiver 120, a memory 122, and a controller 124 communicatively coupled to each of the aforementioned components via, for example, a communication bus 126.

The acoustic emitter 114 can be embodied in a conventional speaker or a piezoelectric speaker that can be caused to emit an audible or an inaudible acoustic signal. While embodiments of the present invention can employ acoustic signals in, what is normally considered human audible range (e.g., 20 Hz to 20 kHz), in preferred embodiments the acoustic signals emitted by the acoustic emitter 114 are in the ultrasonic range (e.g., greater than 20 kHz). The use of ultrasonic signals would be particularly preferred due to their non-invasive nature so that users of the inventions recited herein would not be subjected to hearing constantly periodic acoustic signals.

To be able to receive the acoustic signals emitted by the acoustic emitter 114, acoustic receiver 116 can be embodied in an acoustic sensor like, for example, a microphone or a piezoelectric sensor, which is operable to detect a signal emitted by the acoustic emitter 114 and convert it into a suitable electric signal that is further interpretable by the controller 124. As with the emitter 114, the receiver 116 can be configured to detect signals either in the audible range or inaudible range, or both the audible range and inaudible range. It should, however, be appreciated that in order to have the communication between multiple mobile devices, the receiver 116 of one of the mobile devices needs to be able to detect the range of acoustic signals that is emitted by the emitter 114 of another device. It should also be appreciated that the emitter 114 can be configured to emit signals not necessarily at one given frequency with a given range but can instead be configured to emit signals at varying frequencies with a given range. Conversely, the receiver 116 can also be configured to detect signals not necessarily at a single frequency but at a range of frequencies. The benefit of such an approach will become clearer later in the discussion provided herein.

The display screen 118 is an optional component and can be formed by a variety of available screens like LCD, LED, OLED, any/or any suitable technology which can allow information to be displayed on a screen. In at least some embodiments, the screen 118 can be used to provide an alert the user of the mobile device. However, if desired, this may also be accomplished by a visual beacon like an LED light.

The short-range wireless radio frequency transceiver 120 can be embodied by, for example, a standard-compliant transceiver that can allow for exchange of information over radio frequency signals over a relatively short range that typically extends over a limited distance. In some implementations, the short-range wireless radio transceiver can be a Bluetooth transceiver operable to transmit and receive signals in compliance with the Bluetooth protocol. In other instances, the short-range wireless radio transceiver can be a Wi-Fi transceiver operable to transmit and receive signals in compliance with, for example, 802.11ac protocol.

The memory 122 can be any memory suitable to store a set of computer implementable instructions such as computer code. This can mean that the memory if a volatile or non-volatile flash memory, hard disk memory, magnetic memory, optical memory, or alike. Normally, the memory is configured to store instructions that are accessible by the controller and that when executed cause the controller to control various aspects of the mobile device.

The controller 124 can be embodied by one or more processors which normally control various components of the mobile device pursuant to the instructions stored in the memory 122. In some instances the controller may be a programmable processor, a programmable controller, a graphics processing unit (GPU), a digital signal processor (DSP), etc. Alternatively, the controller 124 may be an application specific integrated circuit (ASIC), a programmable logic device (PLD), a field programmable gate array (FPGA), a field programmable logic device (FPLD), a logic circuit, etc.

It should be appreciated while in some instances the memory 122 and the controller 124 may be formed on separate integrated circuits, in other instances the memory and the controller may be combined on a single chip.

Figure 3:
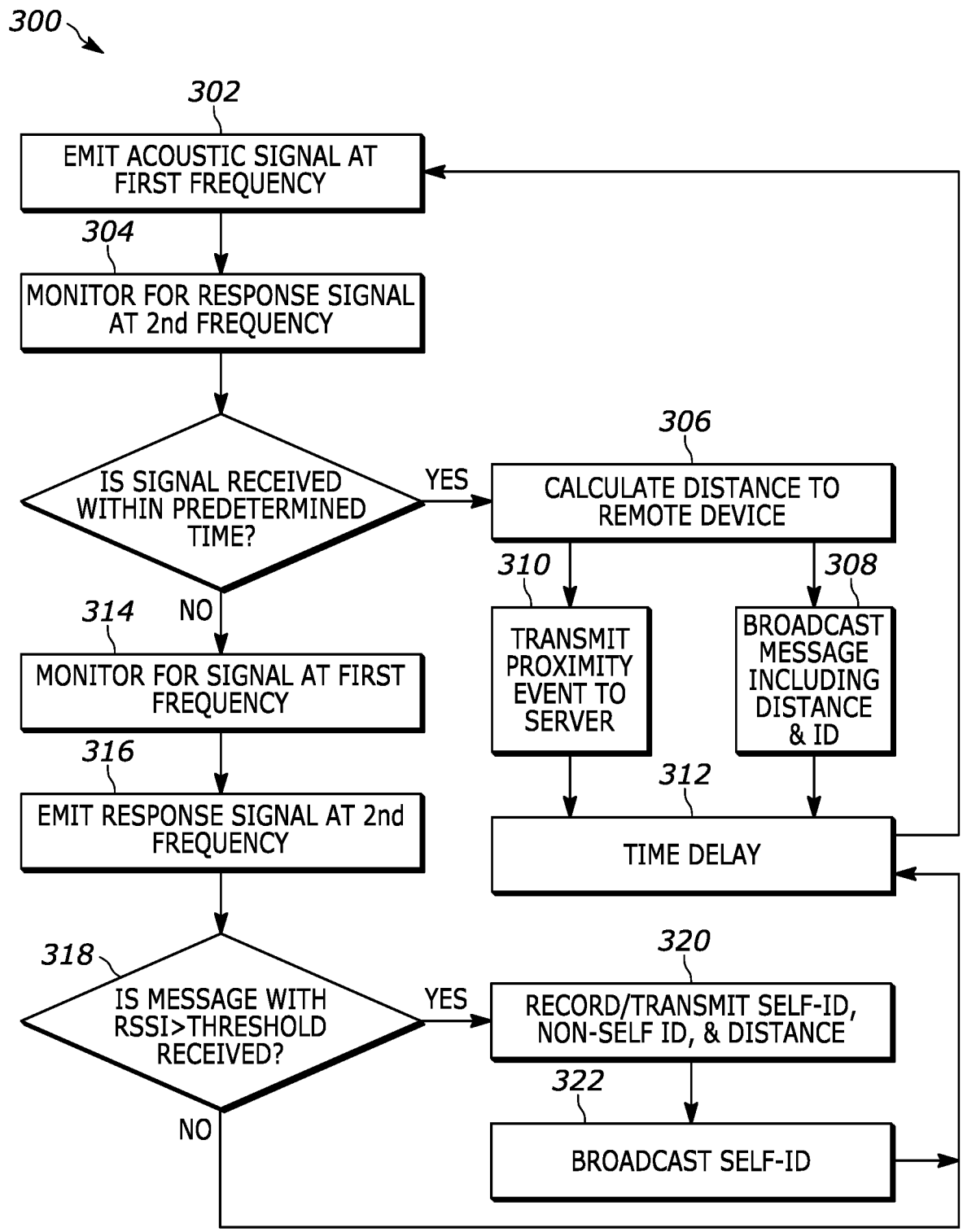
FIG. 3 illustrates a flowchart representative of an exemplary process-flow for ranging between devices in accordance with an embodiment of the present invention.

In at least some embodiments, the mobile device is configured to detect the presence of another mobile device within a close proximity (e.g., 3 feet, 6 feet, 9 feet, 10 feet, 12 feet, 1 meter, 2, meters, 3 meters, etc.) and respond to this event accordingly. This can be achieved by programming the controller to cause the device to function as outlined in the flowchart 300 of FIG. 3. In step 302, the acoustic emitter 114 of the mobile device (e.g., device 106) emits a first acoustic signal at a first frequency and of a predetermined duration (e.g., 2 mS). In preferred embodiments, the emitted signal is within the ultrasonic frequency range above 20 kHz. Subsequent to emitting the acoustic signal, in step 304 the device 106 monitors for a first acoustic response signal generated by a second mobile device (e.g., device 108). In preferred embodiments the response signal is generated by the device 108 at a frequency that is different than the first frequency. This can be particularly beneficial to help avoid receiving passive reflections of the first acoustic signal generated by inanimate objects. In other words, if the device 106 was to generate a first acoustic signal at a given frequency and monitor for a response signal generated by the device 108 at the same frequency, a receipt of a signal that appears to be a response signal at device 106 would not ensure that the received signal was generated by device 108. Instead, this may be a reflection of the first acoustic signal caused by an object (e.g., a table, workbench, refrigerator, wall, etc.) within proximity to the device 106. Generating the response signal at a frequency different from the first signal helps avoid this problem by ensuring that reflections having the frequency of the first signal are not accounted for.

It is important to note that the monitoring for the response signal should occur for a predetermined amount of time following an emission of the first acoustic signal by the acoustic emitter of the first device. This predetermined amount of time $t_1$ can be defined as $t_1=t_{d1}+t_{d2}+(pd-tt)$ where $t_{d1}$ is a duration that an acoustic signal travels from a first point to a second point less than or equal to 10 feet away from the first; $t_{d2}$ is a duration that an acoustic signal travels from the second point to the first point; pd is a predetermined delay; and tt is a known turn-around duration of the device. Under this particular configuration, response signals that are generated by a remote mobile device (e.g., device 108) will be received if the device is within 10 feet from the mobile device that emits the first acoustic signal (e.g., device 106), and those response signals will be ignored if the remote device is further than 10 feet. It should be appreciated that this configuration is only exemplary, and the predetermined time can be adjusted based on the desired distance between the two devices and the turnaround time of the responding device. Thus, assuming the same turnaround time as in the example above, if the device 106 was configured to receive response signals from device 108 only if the device 108 was within an 8 ft radius from device 106, the predetermined amount of time would be reduced relative to the previous example. Conversely, assuming the same turnaround time as in the example above, if the device 106 was configured to receive response signals from device 108 only if the device 108 was within an 12 ft radius from device 106, the predetermined amount of time would be increased relative to the previous example.

If the first acoustic response signal generated by the second mobile device (e.g., device 108) is received within the predetermined amount of time following an emission of the first acoustic signal, the process-flow moves to step 306 where the first device 106 calculates a distance (D) to the second device 108. This can be done as follows:

$$D = \frac{K*(t_{tot}-(pd+tt))}{2}$$

where K is the speed of sound, $t_{tot}$ is the total elapsed time between the emission of the first acoustic signal and receipt of the first acoustic response signal by device 106, pd is the predetermined delay of the remote device, and tt is the known turn-around duration (time a device takes to generate a signal after receiving a signal) of the remote device. It should be noted that in other instances, other factors like, for example, the specific frequency of the signals and environmental factors that affect the speed of sound, can be taken into account if a more exact distance measurement is desired.

Once the distance is calculated, in step 308 the device 106 broadcasts a message, via the short-range wireless radio frequency transceiver, which includes the calculated distance D and an identifier that is associated with the device 106. In some implementations the identifier is a MAC address of the short-range wireless radio frequency transceiver. In some implementations, the identifier is a Bluetooth address and/or name associated with the short-range wireless radio frequency transceiver. In still some implementations, the identifier is a unique number programmed into the controller of device 106.

Additionally, the fact that device 106 has come within a predetermined proximity of another device can be valuable data. Thus, alongside broadcasting the message in step 308, the device 106 can transmit, in step 310, a message to the server 112 to indicate that it has come within some proximity to another device. This information may later be used to correlate, potentially via a timestamp, the receipt and transmission of messages by other devices to confirm which devices have come to within a proximity of device 106.

Upon the completion of the broadcast of the message in step 308, the device returns to step 302 after a time delay in step 312. This time delay is preferably random and ranges between 0 and 500 mS. However, other ranges and/or methods of determining the delay may be used.

Returning to step 304, if a response signal is not received within a predetermined amount of time, device 106 essentially switches roles from a device that is looking for other remote devices within a certain proximity to a device that would be viewed as a remote device from another device's vantage point. For this, in step 314, device 106 monitors, via the acoustic receiver, for a second acoustic signal generated by the remote device 108. In essence, device 106 monitors for a query signal akin to the signal sent out in step 302. Because of this, device 106 monitors for a signal that is transmitted at the same first frequency as the signal noted in step 302. To help reduce a possibility of picking up a distant reflection of the signal transmitted in step 302, an additional time delay may be introduced before step 314 to account for the time needed for such reflections of fall below a detection threshold.

Device 106 enters the monitoring mode of step 314 for some predetermined amount of time (e.g., 100 mS, 250 mS, 500 mS, etc.) The preferred amount of time can be selected based on a theoretically expected number of devices (and thus people wearing the devices) that can be found to be present within a predetermined radius (e.g., 6 ft, 10 ft, 12 ft) such that each of those devices has an opportunity to go through the cycle of step 302-312.

Assuming that a remote device 108 is within a distance which would cause the device 106 to receive a second acoustic signal (generated by device 108) at the first frequency within the predetermined amount of time, responsive to receiving the second acoustic signal, in step 316 device 106 emits, via the acoustic emitter, a second acoustic response signal at the second frequency. As with the first response signal, the second response signal may be within the audible or inaudible, ultrasonic range. Additionally, the second response signal is preferably generated after a predetermined delay which can be calculated as a total delay (e.g., 10 mS) minus the turn-around time of the device 106 (e.g., 2 mS) resulting in the predetermined delay being 8 mS.

Subsequent to transmitting the second response signal, in step 318 device 106 monitors, via the short-range wireless radio frequency transceiver, for a message having a distance measurement and an identifier. This message will have been broadcast by the remote device 108 in response to receiving device's 102 acoustic response signal. In preferred embodiments, the message, when received, must have an RSSI threshold greater than some predetermined threshold.

If such a message is not received, the device 106 returns to step 312. Otherwise, if a message is received, in step 320 device 106 records the non-self-identifier and the distance measurement contained in the message for later transmission to server 112. Alternatively, and if a connection to the server 112 is available, the non-self-identifier and the distance measurement contained in the message are forwarded to the server for recordation immediately. In some embodiments, the transmitted information is also accompanied by the identifier of device 106 such that a complete proximity event between both devices can be recorded.

Additionally, in step 322 device 106 broadcasts its own identifier. This identifier may be a MAC address of the short-range wireless radio frequency transceiver. In some implementations, the identifier may be a Bluetooth address and/or name associated with the short-range wireless radio frequency transceiver. In still some implementations, the identifier may be a unique number programmed into the controller of device 106.

Figure 4:
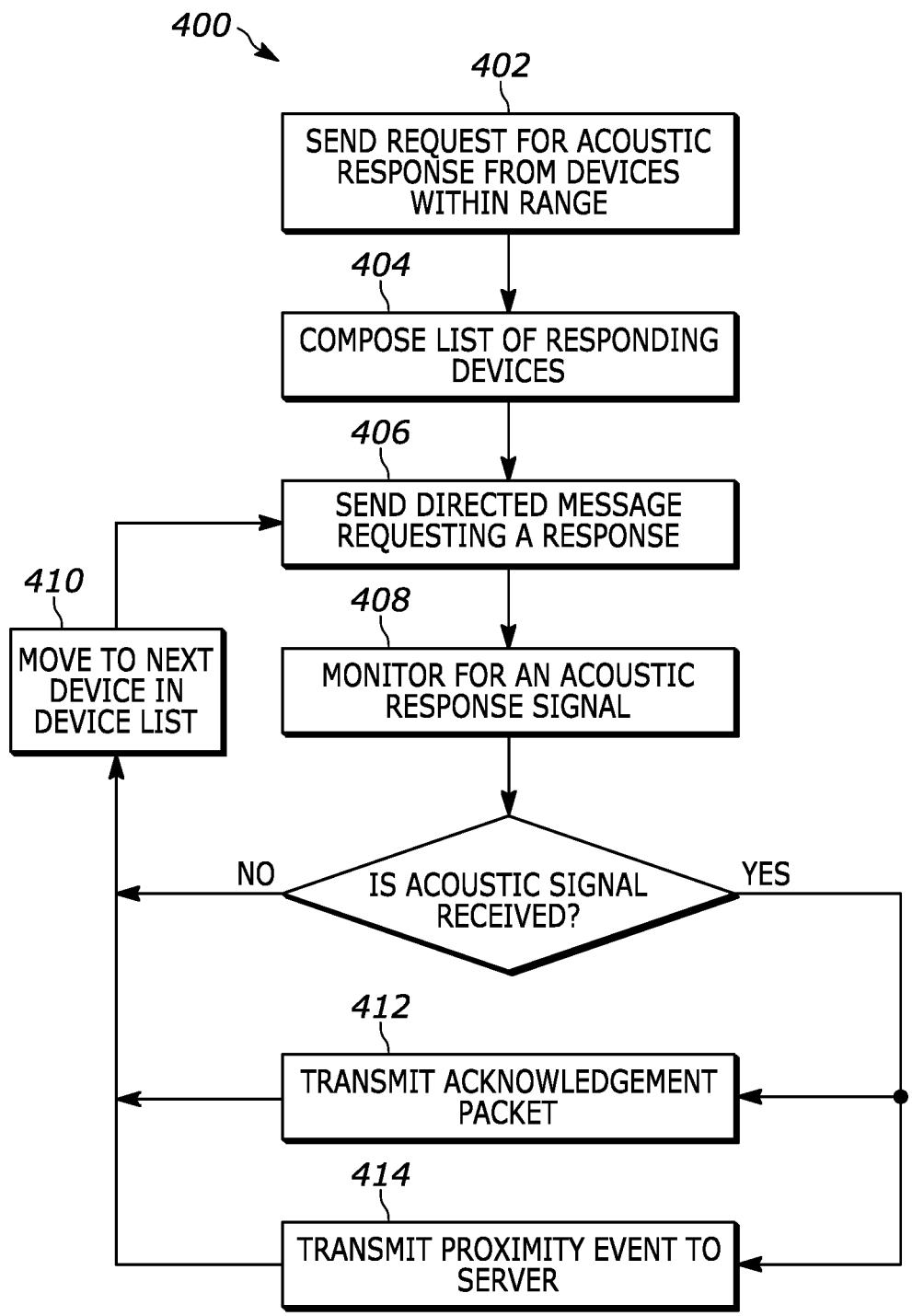
FIG. 4 illustrates a flowchart representative of an exemplary process-flow for ranging between devices in accordance with an embodiment of the present invention.

Another embodiment of a process-flow 400 according to which device 106 may function is shown in FIG. 4. According to this embodiment, in step 402 device 106 (which may also be referred to as an initiator) transmits a request for devices within a certain receiving range to respond. The signal transmitted in this step is preferably transmitted via the short-range wireless radio frequency transceiver at a given RSSI. In some implementations, this signal is transmitted pursuant to a Bluetooth protocol.

In response, each receiving device 108 can be configured to respond if the request signal that was sent in step 302 is received at device 108 with an RSSI being at or above a predetermined criterion. In this manner, remote devices 108 that are positioned a relatively long distance away from the initiator device 106 will not respond while other remote devices 108 that are positioned a relatively short distance away from the initiator device 106, and more importantly within the distance of interest, will respond. As a result of such operation, device 106 is able to construct a list, in step 404, of receiving devices 108 within a certain receiving range. This range can be based on a "safe estimate" of a distance within which keeping track of proximity events is desired.

Once a list has been compiled, for each of the remote devices 108 within the constructed list, device 106 performs the following steps. It is important to note that in the construction of the list, each responding device includes identifying information which allows device 106 to later transmit messages directed to specific devices 108. This enables at least some of the following steps to be performed in a directed manner. Specifically, in step 406 device 106 transmits, via the short-range wireless radio frequency transceiver, a second wireless signal (e.g., Bluetooth signal) requesting a response. This transmission is directed to a specific device in the previously constructed list. In some embodiments, the order of remote devices 108 is predicated on a random selection of devices in the list. In some other embodiments, the selection is predicated based on an RSSI level of the response received in response to the request of step 402. In some embodiments, this selection is predicated on the identifier of the responding device (e.g., ascending or descending order of the device's MAC address).

Once the second wireless signal requesting a response is sent, in step 408 device 106 monitors, via the acoustic receiver, for an acoustic response signal generated by the remote device 108 to which the second wireless signal requesting a response has been directed. As with the prior embodiment of FIG. 3, the acoustic response signal may be within an audible range or within the ultrasonic range. While the initial list of devices generated in step 404 can provide a coarse list of devices potentially within a range of concern (e.g., 6 ft, 10 ft, 12 ft, etc.), limiting the amount of time within which the acoustic response signal can be received can more specifically identify whether or not a remote device 108 to which a request has been sent in step 406 is within that range. Thus, in step 408, device 106 monitors for the acoustic response signal for a predetermined amount of time that is based on the distance of concern. In some embodiments, this amount of time may be expressed as ($t_1$) where $$t_1 = t_{d1} + t_{d2} + (pd - tt)$$

and where $t_{d1}$ is a duration that a radio frequency signal travels from a first point to a second point less than or equal to 10 feet away from the first, $t_{d2}$ is a duration that an acoustic signal travels from the second point to the first point, pd is a predetermined delay, and tt is a known turn-around duration of the device. It should, however, be appreciated that $t_{d1}$ may be a negligible component due to the near instantaneous nature of a radio frequency signal traveling from a first point to a second point less than or equal to 10 feet away from the first.

In alternate embodiments, the second wireless signal—of step 406—requesting a response may be a signal requesting that the remote device 108 respond with an acoustic response at a precise time. This can be done when the remote devices 108 are synchronized to a common clock and/or communicate via a protocol like the Wireless Precision Time Protocol described by IEEE 1588, which is incorporated herein by reference in its entirety. The use of such protocol allows the peer devices to be synchronized to a common clock and to act at precise moment. Thus, the second wireless signal of step 406 may be a request directed to a remote device 108 for the remote device 108 to respond at a specific time $t_r$. At the same time $t_r$, the requesting device 106 begins to monitor for a receipt of the acoustic response signal generated by the remote device 108 in a manner that is similar to step 408. However, in this instance since the time of the launch of the acoustic response signal is known, the duration window for monitoring for the response can be based simply on the critical distance. For instance, using the notion that speed×time equals distance, if the critical distance is 6 feet, one can determine that the time that that an acoustic signal would take to traverse that distance is 5.33 milliseconds. Thus, the window $t_1$ during which the requesting device 106 can monitor for a response signal can last 5.33 milliseconds starting at time $t_r$. This, of course, is merely exemplary and other critical distances may be used as desired.

If no acoustic response signal is received within the time $t_1$, this may be treated as the remote device being outside of the range of concern, and thus in step 410 device 106 can move to the next remote device 108 in the list of devices generated in step 404 and thereafter return to step 406.

On the other hand, if an acoustic response signal is received within the time $t_1$, this may be treated as the remote device being within the range of concern. If this occurs, in step 412 device 106 transmits, via the short-range wireless radio frequency transceiver, a third wireless signal directed towards the responding remote device that includes including an acknowledgement of receiving the first acoustic response signal.

Since an acoustic signal received within a certain time would be indicative of a device being within a certain range, calculation of a distance between the device 106 and device 108 is not necessary if the goal is to report proximity events which occur simply by virtue of two devices being within a certain range. However, if specific measurements are desired, device 106 can perform further distance calculations based on the duration between the transmission of the request sent in step 406 and the receipt of the acoustic response signal, and this measurement can also be transmitted as part of the acknowledgement message. In this instance, distance (D) to the second device 108 may be calculated as follows:

$$D=K*(t_{tot}-(pd+tt))$$

where K is the speed of sound, $t_{tot}$ is the total elapsed time between the emission of the request in step 406 and receipt of the acoustic response signal by device 106, pd is the predetermined delay of the remote device, and tt is the known turn-around duration (time a device takes to generate a signal after receiving a signal) of the remote device. It should be appreciated that the equation above essentially overlooks the time that the request signal takes to travel from device 106 to device 108 since this time would be near-instantaneous and would have practically have no impact on the overall calculation of the distance. It should also be noted that in other instances, other factors like, for example, the specific frequency of the signals and environmental factors that affect the speed of sound, can be taken into account if a more exact distance measurement is desired.

In addition to transmitting an acknowledgement, device 106 can also transmit the information related to the proximity event upstream to server 112 in step 414. This may include information related to identifying devices 102 and 104, time of occurrence, duration of the proximity event, and/or distance between devices. A similar upstream transmission of information can also occur from device 108 once the acknowledgement packet is received. While both devices 102 and 104 can transmit the respective data to server 112, in some embodiments only device 106 may transmit the information to the server while in some other embodiment only device 108 may transmit the information to the server. It should also be noted that is an immediate link to the server is not available, data that is to be transmitted to the server may be stored in a memory buffer for a later transmission.

Once the acknowledgement packet has been transmitted and information sent to the server, device 106 proceed to the next device in the list (step 410) and returns to step 406 to continue its inquiry of devices that are potentially within a capital range.

It should be noted that embodiments of the present invention can be particularly useful in identifying when individuals wearing devices 106, 108 on their person come within a critical range of each other. By way of the methodologies described above, users of devices 106, 108 can limit their exposure to other individuals, potentially lessening their chances of being infected with viruses like COVID-19 or any other viruses where distance and duration of exposure to an infected individual may be critical.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A device for use in ranging relative to a remote device, comprising
an acoustic emitter;
an acoustic receiver;
a short-range wireless radio frequency transceiver; and
a controller communicatively coupled to each of the acoustic emitter, the acoustic receiver, and the short-range wireless radio frequency transceiver, the controller being configured to:
cause the acoustic emitter to emit a first acoustic signal at a first frequency;
monitor, via the acoustic receiver and for a first predetermined amount of time following an emission of the first acoustic signal by the acoustic emitter, for a first acoustic response signal generated by the remote device at a second frequency that is different from the first frequency; and
responsive to receiving the first acoustic response signal within the first predetermined amount of time, (1) calculate a first distance between the device and the remote device based on a duration between emitting the first acoustic signal and receiving the first acoustic response signal, and (2) broadcast, via the short-range wireless radio frequency transceiver, a first message including the distance and a first identifier associated with at least one of the device or the short-range wireless radio frequency transceiver,
wherein the second message is selected based on having a Received Signal Strength Indicator (RSSI) that is greater than a threshold RSSI and that is greater than any other RSSI of any other message received by the device and communicated via a protocol used to broadcast the first message.

2. The device of claim 1, wherein, responsive to not receiving the acoustic response signal within the first predetermined amount of time, the controller is further configured to:
monitor, via the acoustic receiver, for a second acoustic signal generated by the remote device at the first frequency; and
responsive to receiving the second acoustic signal:
cause the acoustic emitter to emit a second acoustic response signal at the second frequency; and
monitor, via the short-range wireless radio frequency transceiver, for a second message having a second distance measurement and a second identifier, the second message generated by the remote device.

3. The device of claim 2, wherein, responsive to receiving the second message, the controller is further configured to at least one of (i) record the second message in a memory or (ii) transmit the second message upstream for recordation by a remote server.

4. The device of claim 2, wherein:
causing the acoustic emitter to emit the first acoustic signal and monitoring for the first acoustic response signal constitutes a first mode of operation;
monitoring for the second acoustic signal constitutes a second mode of operation; and
wherein the controller is further configured to revert to the first mode of operation from the second mode of operation responsive to not receiving the second acoustic signal within a second predetermined amount of time.

5. The device of claim 2, wherein, responsive to receiving the second acoustic signal, the controller is configured to cause the acoustic emitter to emit the second acoustic response signal after a predetermined delay less a known turn-around duration of the device.

6. The device of claim 1, wherein the first predetermined amount of time ($t_1$) is defined as:

$$t_1 = t_{d1} + t_{d2} + (pd - tt)$$

wherein:
$t_{d1}$ is a duration that an acoustic signal travels from a first point to a second point less than or equal to 10 feet away from the first;
$t_{d2}$ is a duration that an acoustic signal travels from the second point to the first point;
pd is a predetermined delay; and
tt is a known turn-around duration of the device.

7. A method for ranging between a first device and a second device, each of the first device and the second device respectively having an acoustic emitter, an acoustic receiver, a short-range wireless radio frequency transceiver, and a controller communicatively coupled to each of the acoustic emitter, the acoustic receiver, and the short-range wireless radio frequency transceiver, the method comprising:
emitting, via the acoustic emitter of the first device, a first acoustic signal at a first frequency;
monitoring, via the acoustic receiver of the first device and for a first predetermined amount of time following an emission of the first acoustic signal by the acoustic emitter of the first device, for a first acoustic response signal generated by the second device at a second frequency that is different from the first frequency; and
responsive to receiving the first acoustic response signal within the first predetermined amount of time, (1) calculating, via the controller of the first device, a first distance between the first device and the second device based on a duration between emitting the first acoustic signal and receiving the first acoustic response signal, and (2) broadcast, via the short-range wireless radio frequency transceiver of the first device, a first message including the distance and a first identifier associated with at least one of the first device or the short-range wireless radio frequency transceiver of the first device,
wherein the second message is selected based on having a Received Signal Strength Indicator (RSSI) that is greater than a threshold RSSI and that is greater than any other RSSI of any other message received by the device and communicated via a protocol used to broadcast the first message.

8. The method of claim 7, wherein, responsive to not receiving the acoustic response signal within the first predetermined amount of time, the method further includes:

monitoring, via the acoustic receiver of the first device, for a second acoustic signal generated by the second device at the first frequency; and responsive to receiving the second acoustic signal:

emitting, via the acoustic emitter of the first device, a second acoustic response signal at the second frequency; and monitoring, via the short-range wireless radio frequency transceiver of the first device, for a second message having a second distance measurement and a second identifier, the second message generated by the second device.

9. The method of claim 8, wherein, responsive to receiving the second message, the method further includes at least one of (i) recording the second message in a memory of the first device or (ii) transmitting the second message upstream for recordation by a remote server.

10. The method of claim 8, wherein:

emitting the first acoustic signal and monitoring for the first acoustic response signal constitutes a first mode of operation;

monitoring for the second acoustic signal constitutes a second mode of operation; and wherein the method further includes reverting to the first mode of operation from the second mode of operation responsive to not receiving the second acoustic signal within a second predetermined amount of time.

11. The method of claim 8, wherein, responsive to receiving the second acoustic signal, the method further includes emitting, via the acoustic emitter of the first device, the second acoustic response signal after a predetermined delay less a known turn-around duration of the first device.

12. The method of claim 7, wherein the first predetermined amount of time ($t_1$) is defined as:

$$t_1 = t_{d1} + t_{d2} + (pd - tt)$$

wherein:

$t_{d1}$ is a duration that an acoustic signal travels from a first point to a second point less than or equal to 10 feet away from the first;

$t_{d2}$ is a duration that an acoustic signal travels from the second point to the first point;

pd is a predetermined delay; and tt is a known turn-around duration of the device.

13. A device for use in ranging, comprising an acoustic emitter;

an acoustic receiver;

a short-range wireless radio frequency transceiver; and a controller communicatively coupled to each of the acoustic emitter, the acoustic receiver, and the short-range wireless radio frequency transceiver, the controller being configured to:

compose a list of remote devices within a predetermined Received Signal Strength Indicator (RSSI) range by causing the short-range wireless radio frequency transceiver to emit a first wireless signal and respectively registering a first response wireless signal received from each of the remote devices within the predetermined RSSI range; and for each of the remote devices:

transmit, via the short-range wireless radio frequency transceiver, a second wireless signal requesting a response;

monitor, via the acoustic receiver and for a first predetermined amount of time following a transmission of the second wireless signal, for a first acoustic response signal generated by one of the remote devices; and responsive to receiving the first acoustic response signal within the first predetermined amount of time, (1) calculate a first distance between the device and the one of the remote devices based on a duration between transmitting the second wireless signal and receiving the first acoustic response signal, and (2) broadcast, via the short-range wireless radio frequency transceiver, a third wireless signal including an acknowledgement of receiving the first acoustic response signal.

14. The device of claim 13, wherein the predetermined RSSI range is based on a strength of a radio frequency signal received approximately 10 feet away from a source of the radio frequency signal.

15. The device of claim 13, responsive to receiving the first acoustic response signal within the first predetermined amount of time, the controller is further configured to at least one of (i) record the second message in a memory of the device or (ii) transmit the second message upstream for recordation by a remote server.

16. The device of claim 13, wherein the first predetermined amount of time ($t_1$) is defined as:

$$t_1 = t_{d1} + t_{d2} + (pd - tt)$$

wherein:

$t_{d1}$ is a duration that a radio frequency signal travels from a first point to a second point less than or equal to 10 feet away from the first;

$t_{d2}$ is a duration that an acoustic signal travels from the second point to the first point;

pd is a predetermined delay; and tt is a known turn-around duration of the device.

* * * * *